(12) United States Patent
Tang et al.

(10) Patent No.: US 9,989,751 B2
(45) Date of Patent: Jun. 5, 2018

(54) SIGHT

(71) Applicants: Sintai Optical (Shenzhen) Co., Ltd., Shenzhen, Guandong Province (CN); Asia Optical International Ltd., Tortola (GB)

(72) Inventors: Chia-Chi Tang, Taichung (TW); Tzu-Ching Liao, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 163 days.

(21) Appl. No.: 14/144,645

(22) Filed: Dec. 31, 2013

(65) Prior Publication Data
US 2014/0347751 A1 Nov. 27, 2014

(30) Foreign Application Priority Data
May 23, 2013 (TW) .............................. 102118216 A (51) Int. Cl.
*G02B 7/02* (2006.01)
*G02B 23/16* (2006.01)
*F41G 1/027* (2006.01)
*F41G 1/14* (2006.01)
*F41G 1/38* (2006.01)

(52) U.S. Cl.
CPC ............. *G02B 23/16* (2013.01); *F41G 1/027* (2013.01); *F41G 1/14* (2013.01); *F41G 1/38* (2013.01); *G02B 7/026* (2013.01)

(58) Field of Classification Search
CPC .................................. G02B 7/021; G02B 7/02
USPC .................................................. 359/811, 819
See application file for complete search history.

(56) References Cited

U.S. PATENT DOCUMENTS

| | | | | |
|---|---|---|---|---|
| 3,904,276 A | * | 9/1975 | Whitaker | G02B 7/026 359/819 |
| 4,302,076 A | * | 11/1981 | Hashimoto | G02B 7/026 359/830 |
| 4,854,671 A | * | 8/1989 | Hanke | G02B 7/028 359/820 |
| 5,177,641 A | * | 1/1993 | Kobayashi et al. | 359/820 |
| 5,548,450 A | * | 8/1996 | Kang | G02B 7/026 359/822 |
| 6,377,408 B1 | * | 4/2002 | Shinohara | G02B 7/04 174/254 |
| 2007/0121223 A1 | * | 5/2007 | Watanabe | 359/811 |
| 2009/0303376 A1 | * | 12/2009 | Guo | G02B 7/04 348/335 |

(Continued)

FOREIGN PATENT DOCUMENTS

CN 1104764 A 7/1995
TW 201038913 A 11/2010

*Primary Examiner* — James Greece
(74) *Attorney, Agent, or Firm* — McClure, Qualey & Rodack, LLP (57) ABSTRACT

A sight includes a cylinder, a first lens, a first lens seat, and at least one first elastic member. The first lens is disposed in the cylinder. The first lens seat carrying the first lens is disposed in the cylinder. The first elastic member is disposed between an outer surface of the first lens seat and an inner periphery of the cylinder, wherein the first lens seat is tightly fitted with the cylinder and light enters the cylinder through the first lens.

20 Claims, 6 Drawing Sheets

(56) References Cited

U.S. PATENT DOCUMENTS

2012/0019905 A1* 1/2012 Teraoka ................ G02B 7/021
359/356

* cited by examiner

SIGHT

BACKGROUND OF THE INVENTION

Field of the Invention

The invention relates to a sight including an erector lens and especially a sight with an erector lens seat tightly fitted in a cylinder by an elastic member.

Description of the Related Art

The optical sights used in shooting weapons usually include erector lenses, which transform the image formed in the optical system into an upright image for users' ease of watching. The erector lens is disposed in a cylinder of the sight with a lens seat, and the fitting process of the lens seat into the cylinder could result in an aiming reticule jittering or parallax problem in case of a gap between the lens seat and the cylinder. Therefore, the fitting tolerances between the lens seat and the cylinder and tolerance control on each part are very critical. In order to tightly fit the erector lens sea into the cylinder, the machine tool and grinding process are usually used and combined with stringent tolerance control or real part assembly check, and the manufacturing cost is raised as a burden on both producer and buyer. In addition, the metallic material for making the lens seat causes another relatively higher cost.

BRIEF SUMMARY OF THE INVENTION

According to the above or other objects, the invention provides a sight including an elastic member between an erector lens seat and a cylinder to tightly fit the lens seat into the cylinder, for improving an aiming reticule jittering or parallax problem. Therefore, the manufacturing cost can be reduced by the downgraded tolerance requirement, and the lens seat of the invention can be made of plastic material for a lower cost.

In an exemplary embodiment, the sight of the invention includes a cylinder, a first lens, a first lens seat, and at least one first elastic member. The first lens is disposed in the cylinder. The first lens seat is disposed in the cylinder to carry the first lens. The first elastic member is disposed between the outer surface of the first lens seat and the inner periphery of the cylinder, wherein the first lens seat is tightly fitted into the cylinder and light enters the cylinder through the first lens.

In another exemplary embodiment, the first lens seat is cylindrical and includes a first fitting ring to fix the first lens in the first lens seat.

In yet another exemplary embodiment, the sight further includes a second lens, a second lens seat, and at least one second elastic member. The second lens is disposed in the cylinder. The second lens seat is disposed in the cylinder to carry the second lens. The second elastic member is disposed between the outer surface of the second lens seat and the inner periphery of the cylinder, wherein the second lens seat is tightly fitted with the cylinder, and the light axes of the first lens and the second lens are coincident, and the light enters the cylinder sequentially through the first lens and the second lens.

In another exemplary embodiment, the first and second lens seats are made of plastic material.

In yet another exemplary embodiment, the second lens seat is cylindrical and includes a second fitting ring to fix the second lens in the second lens seat.

In another exemplary embodiment, the first lens and the second lens form an erector lens.

In yet another exemplary embodiment, the sight further includes a first knob with a first male screw portion for engaging a first female screw portion through a slot, wherein the female screw portion is formed in the first lens seat and the slot is formed in the cylinder.

In another exemplary embodiment, the sight further includes a second knob with a second male screw portion for engaging a second female screw portion through a slot, wherein the second female screw portion is formed in the second lens seat and the slot is formed in the cylinder.

In yet another exemplary embodiment, the first female screw portion is fixed to the first lens seat by insert molding, and the second female screw portion is fixed to the second lens seat by insert molding. The first female screw portion and the second female screw portion are made of metallic material.

In another exemplary embodiment, the a first recess is formed on the outer surface of the first lens seat for accommodating the first elastic member, and a second recess is formed on the outer surface of the second lens seat for accommodating the second elastic member.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
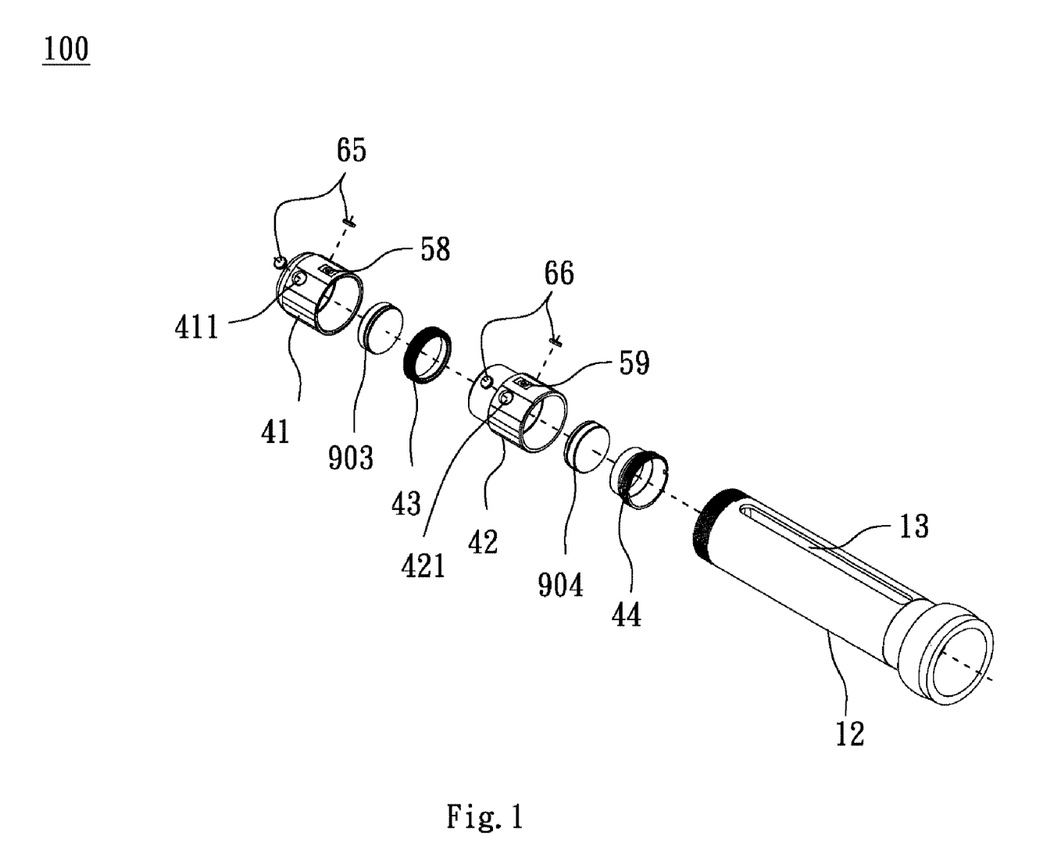
FIG. 1 is a perspective exploded view of a sight in accordance with an embodiment of the invention.

FIG. 1 shows a sight 100 in accordance with an embodiment of the invention, which includes a cylinder 12, a first lens seat 41, a first lens 903, a first elastic member 65, a second lens seat 42, a second lens 904, a second elastic member 66, a first fitting ring 43, and a second fitting ring 44. The cylinder 12 is in a long cylindrical shape and includes a slot 13 parallel to the axis of the cylinder. The first lens seat 41 and the second lens seat 42 are both cylindrical and made of plastic material. A first recess 411 is formed on an outer surface of the first lens seat 41, and a second recess 421 is formed on an outer surface of the second lens seat 42. The first recess 411 and the second recess 421 are configured to respectively accommodate the first elastic member 65 and the second elastic member 66.

Figure 2:
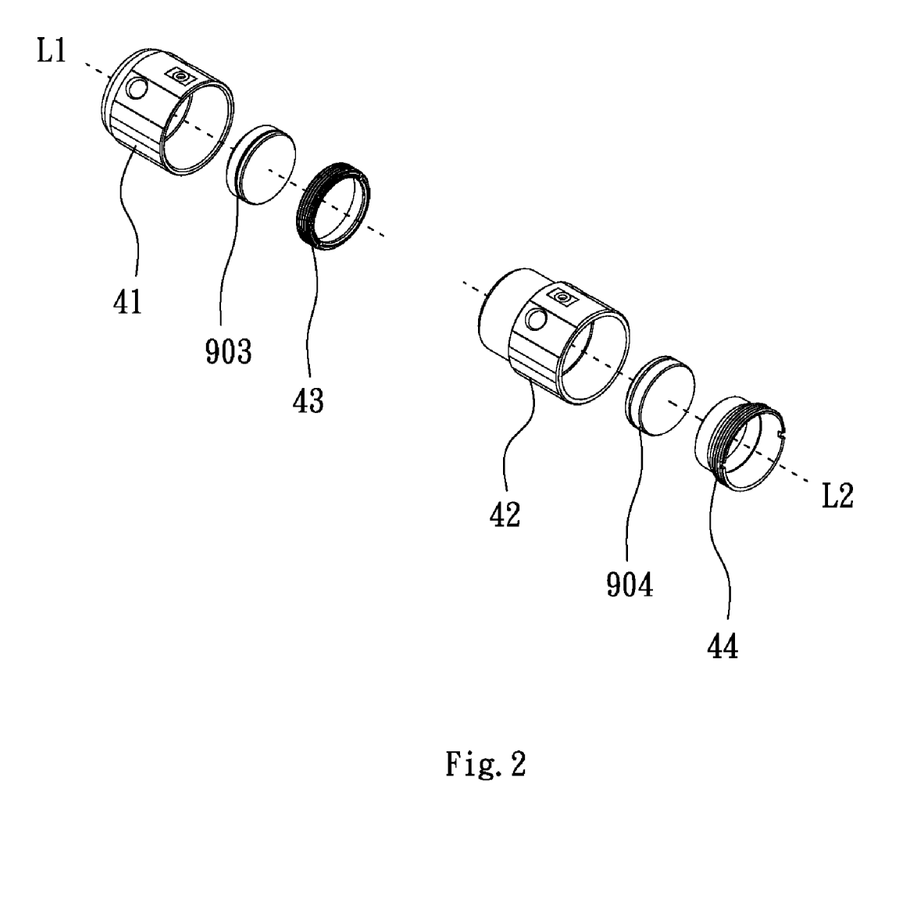
FIGS. 2-4 show an assembling process of the sight in accordance with the embodiment of the invention.
Figure 3:
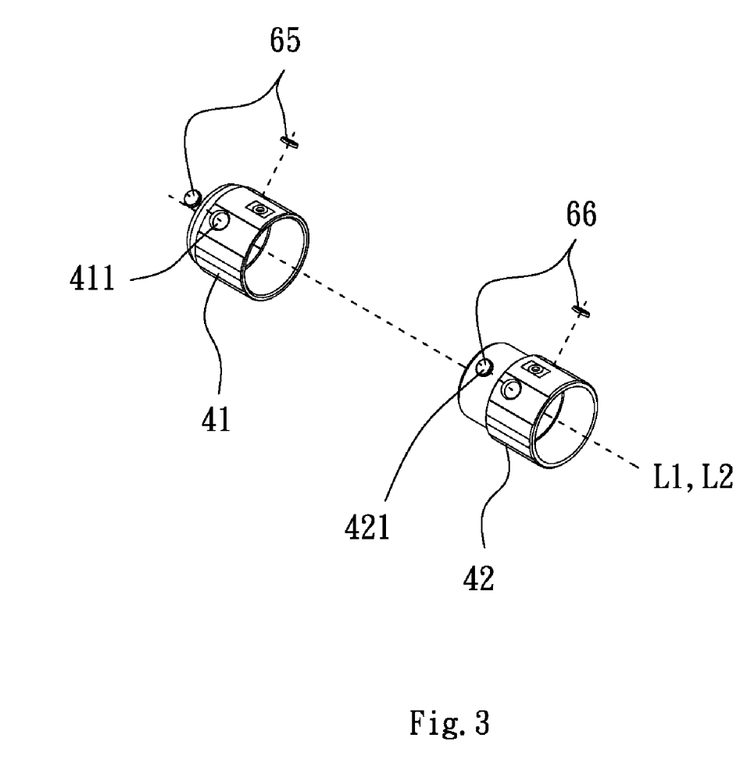
Figure 4:
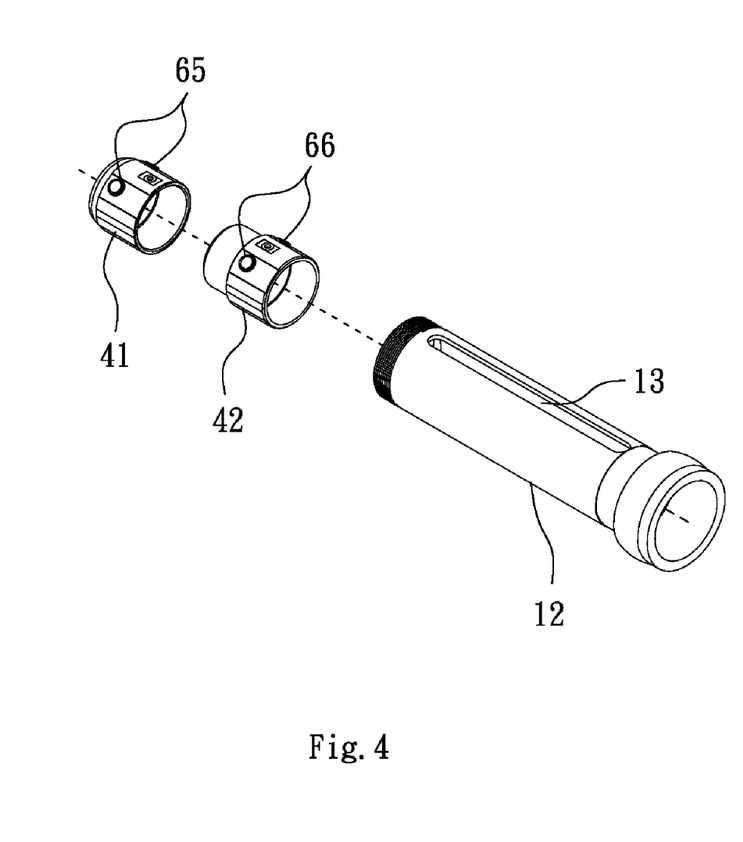

The assembly detail of the sight 100 in accordance with the embodiment of the invention is as follows: the first lens 903 is tightly fitted in the first lens seat 41 with the first fitting ring 43 as shown in FIG. 2, and the first lens 903 includes a light axis L1; similarly, the second lens 904 is tightly fitted in the second lens seat 42 with the second fitting ring 44, and the first lens 903 includes a light axis L2; as shown in FIG. 3, the first elastic member 65 and the second elastic member 66 are respectively accommodated in the first recess 411 and the second recess 421; as shown in FIG. 4, the first lens seat 41 with the first lens 903 and the second lens seat 42 with the second lens 904 are assembled in the cylinder 12 wherein the axis L1 of the first lens 903 and the axis L2 of the second lens 904 are coincident, the first elastic member 65 is disposed between the first lens seat 41 and the cylinder 12, and the second elastic member 66 is disposed between the second lens seat 42 and the cylinder 12. In the sight 100 of the invention, the first lens 903 and the second lens 904 form an erector lens. The sight 100 further includes an objective lens and an ocular lens which are not shown in figures for simplification. The light from an object enters the cylinder 12 through the objective lens, and sequentially passes the first lens 903, the second lens 904, and the ocular lens to be observed by the user.

Figure 5:
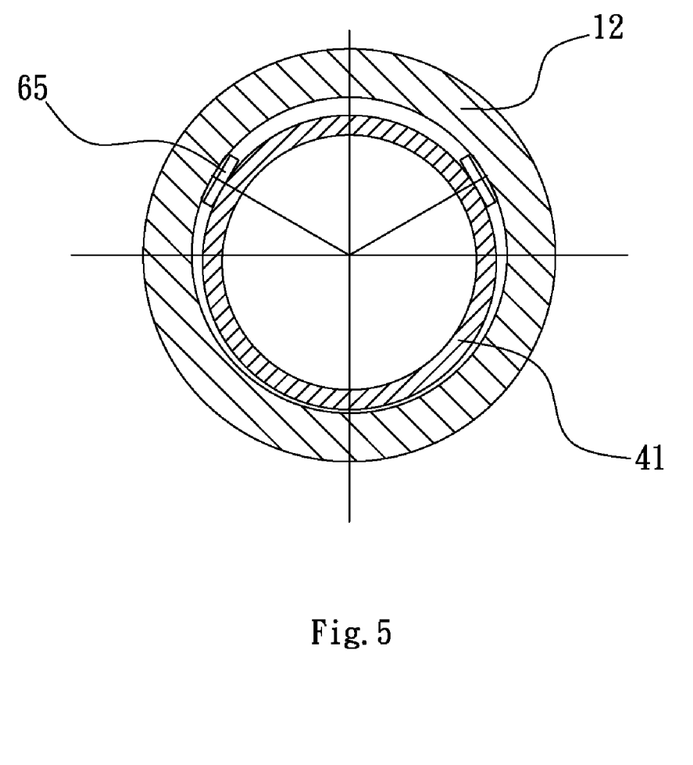
FIG. 5 is a section view of the sight in accordance with the embodiment of the invention.

FIG. 5 shows the disposition of the first lens seat 41 into the cylinder 12. The first lens seat 41 is tightly fitted into the inner periphery of the cylinder 12 by the first elastic member 65 to prevent the first lens seat 41 from jittering or the parallax problem. By the similar concept, the second lens seat 42 is tightly fitted into the inner periphery of the cylinder 12 by the second elastic member 66.

Figure 6:
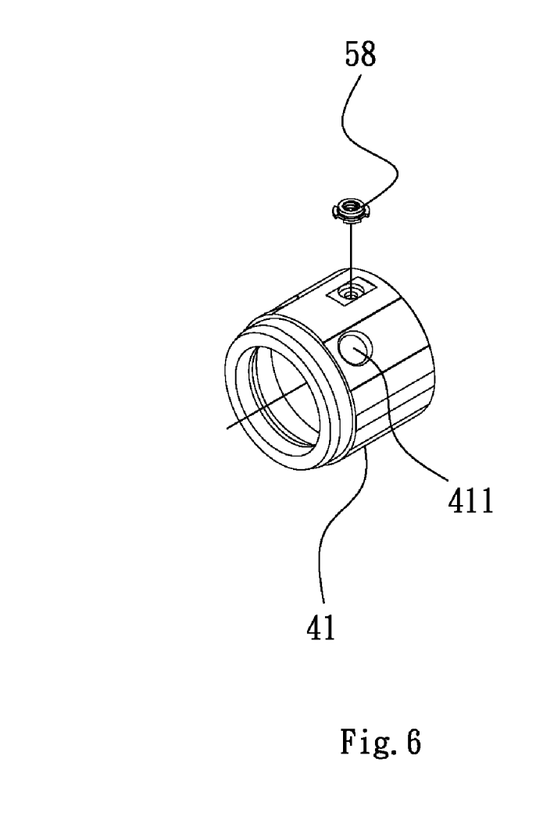
FIG. 6 is an exploded view of the first lens seat and the first female screw portion in accordance with the embodiment of the invention.
Figure 7:
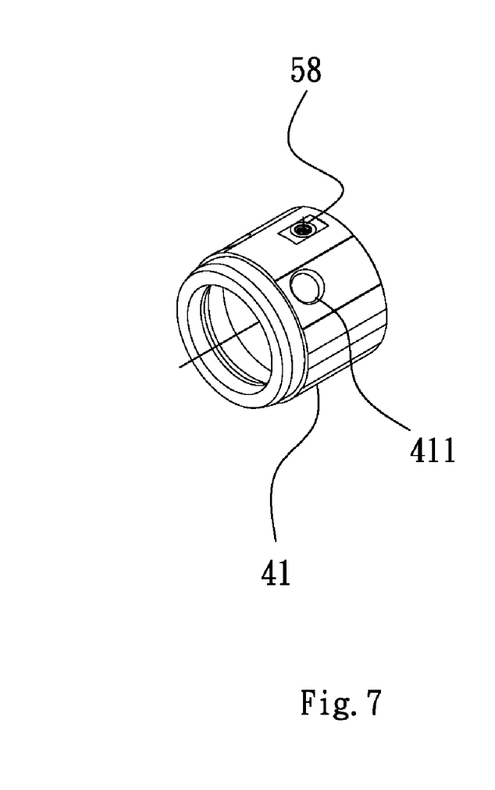
FIG. 7 shows an assembly of the first lens seat and the first female screw portion in accordance with the embodiment of the invention.

FIGS. 6 and 7 are respectively an exploded view and an assembly view of the first lens seat 41 and the first female screw portion 58. The first lens seat 41 is made by plastic injection. The first lens seat 41 includes a first female screw portion which is made of metallic material and fixed to the first lens seat 41 by insert molding. The first female screw portion 58 is used to engage the first male screw portion of a first knob (not shown), and the first male screw portion of the first knob passes through a slot 13 (shown in FIGS. 1 and 4) to engage the first female screw portion 58 of the first lens seat 41, whereby the first lens seat 41 can be fixed in the cylinder 12 by propping the first knob against the cylinder 12. The first lens seat 41 can be moved to a suitable location in the cylinder 12 by loosening the first knob, and fixed at the suitable location by tightening the first knob. Thus, the location of the first lens seat 41 in the cylinder 12 can be adjusted. Referring to FIG. 1, the second lens seat 42 includes a second female screw portion 59 which functions similar to the first female screw portion 58. The second female screw portion 59 engages the second male screw portion of a second knob so that the second knob can function similar to the first knob.

According to the sight of the invention, the lens seat and the cylinder can be tightly fitted for improving reticule jittering and parallax problem by the elastic member disposed between the lens seat and the cylinder. Also, the tolerance control requirement for manufacturing lens seat can be downgraded to reduce the manufacturing cost.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sight, comprising:
a first lens, having a first optical axis;
a first lens seat, having a first cylindrical housing with a first outer surface exhibiting a first outer diameter, wherein the first lens is disposed in the first lens seat;
a cylinder having a central axis, a first open end, a second open end opposing the first open end and an inner surface defining an inner diameter, wherein the first outer diameter is smaller than the inner diameter and the first lens seat is disposed in the cylinder; and
at least one first elastic member, disposed between the first outer surface of the first lens seat and the inner surface of the cylinder, wherein when the first lens seat is fitted with the cylinder, a first portion of the first outer surface of the first lens seat and an outward-facing surface of the first elastic member contact the cylinder such that the first optical axis is not aligned with the central axis.

2. The sight as claimed in claim 1, wherein the first lens seat includes a first fitting ring to fix the first lens in the first lens seat.

3. The sight as claimed in claim 1, further comprising:
a second lens seat, disposed in the cylinder and having a second cylindrical housing with a second outer surface exhibiting a second outer diameter smaller than the inner diameter;
a second lens, disposed in and carried by the second lens seat and having a second optical axis; and
at least one second elastic member, disposed between the second outer surface of the second lens seat and the inner surface of the cylinder, wherein when the second lens seat is fitted with the cylinder, the first optical axis of the first lens and the second optical axis of the second lens are coincident, and light enters the cylinder to sequentially pass through the first lens and the second lens.

4. The sight as claimed in claim 3, wherein the second lens seat includes a second fitting ring to fix the second lens in the second lens seat.

5. The sight as claimed in claim 1, further comprising a first knob which includes a first male screw portion configured to engage a first female screw portion through a slot, wherein the first female screw portion is formed in the first lens seat and the slot is formed in the cylinder.

6. The sight as claimed in claim 5, wherein the first female screw portion is fixed to the first lens seat by insert molding, and the first female screw portion is made of a metallic material.

7. The sight as claimed in claim 3, further comprising a second knob which includes a second male screw portion configured to engage a second female screw portion through a slot, wherein the second female screw portion is formed in the second lens seat and the slot is formed in the cylinder.

8. The sight as claimed in claim 7, wherein the second female screw portion is fixed to the second lens seat by insert molding, and the second female screw portion is made of a metallic material.

9. The sight as claimed in claim 3, wherein a first recess is formed on the first outer surface of the first lens seat for accommodating the first elastic member, and a second recess is formed on the second outer surface of the second lens seat for accommodating the second elastic member.

10. A sight, comprising:
a first lens, having a first optical axis;
a first lens seat, having a first cylindrical housing with a first outer surface exhibiting a first outer diameter, wherein the first lens is disposed in the first lens seat;
a cylinder having a central axis, a first open end, a second open end opposing the first open end and an inner surface defining an inner diameter, wherein the first outer diameter is smaller than the inner diameter and the first lens seat is disposed in the cylinder; and
at least one first elastic member, disposed between and contacting the first outer surface of the first lens seat and the inner surface of the cylinder, wherein when the first lens seat is fitted with the cylinder, a first portion of the first outer surface of the first lens seat contacts the cylinder such that a distance between the central axis and the first portion of the first outer surface is different to another distance between the central axis and a second portion of the first outer surface which the first elastic member contacts.

11. The sight as claimed in claim 10, wherein the first lens seat includes a first fitting ring to fix the first lens in the first lens seat.

12. The sight as claimed in claim 10, further comprising:
a second lens seat, disposed in the cylinder and having a second cylindrical housing with a second outer surface exhibiting a second outer diameter smaller than the inner diameter;
a second lens, disposed in and carried by the second lens seat and having a second optical axis; and
at least one second elastic member, disposed between the second outer surface of the second lens seat and the inner surface of the cylinder, wherein when the second lens seat is fitted with the cylinder, the first optical axis of the first lens and the second optical axis of the second lens are coincident, and light enters the cylinder to sequentially pass through the first lens and the second lens.

13. The sight as claimed in claim 12, wherein the first lens seat and the second lens seat are made of plastic material.

14. The sight as claimed in claim 12, wherein the second lens seat includes a second fitting ring to fix the second lens in the second lens seat.

15. The sight as claimed in claim 10, further comprising a first knob which includes a first male screw portion configured to engage a first female screw portion through a slot, wherein the first female screw portion is formed in the first lens seat and the slot is formed in the cylinder.

16. The sight as claimed in claim 15, wherein the first female screw portion is fixed to the first lens seat by insert molding, and the first female screw portion is made of a metallic material.

17. The sight as claimed in claim 12, further comprising a second knob which includes a second male screw portion configured to engage a second female screw portion through a slot, wherein the second female screw portion is formed in the second lens seat and the slot is formed in the cylinder.

18. The sight as claimed in claim 12, wherein a first recess is formed on the first outer surface of the first lens seat for accommodating the first elastic member, and a second recess is formed on the second outer surface of the second lens seat for accommodating the second elastic member.

19. The sight as claimed in claim 1, wherein the first portion of the first outer surface of the first lens seat is located in a first hemisphere of the cylinder, and the first elastic member is located in a second hemisphere of the cylinder.

20. The sight as claimed in claim 1, wherein the first elastic member does not contact the first lens.

* * * * *